United States Patent [19]

Lee et al.

[11] Patent Number: 6,146,449
[45] Date of Patent: Nov. 14, 2000

[54] REUSABLE CANISTER FOR A GAS MASK

[75] Inventors: Hoo-Kun Lee; Seong-Won Park; Seung-Gy Ro; Hyun-Soo Park, all of Daejeon-Si, Rep. of Korea

[73] Assignees: Korea Atomic Energy Research Institute, Daejeon-Si; Korea Electric Power Corporation, Seoul, both of Rep. of Korea

[21] Appl. No.: 09/186,070

[22] Filed: Nov. 5, 1998

[30] Foreign Application Priority Data

Jun. 23, 1998 [KR] Rep. of Korea ................... 98-23605

[51] Int. Cl.[7] ............................. B01D 53/04; B01D 46/42
[52] U.S. Cl. ........................... 96/117.5; 55/DIG. 33; 96/135; 96/417; 128/206.17
[58] Field of Search ........................ 55/502, 498, 482, 55/486, DIG. 33; 96/111, 117.5, 413, 414, 417, 134, 135, 138, 139; 128/206.12, 206.17

[56] References Cited

U.S. PATENT DOCUMENTS

| | | | |
|---|---|---|---|
| 1,537,519 | 5/1925 | Yablick | 55/DIG. 33 |
| 2,787,333 | 4/1957 | Boone et al. | 96/139 |
| 2,825,424 | 3/1958 | Gross | 96/139 |
| 3,873,288 | 3/1975 | Wachter et al. | 55/DIG. 35 |
| 3,944,403 | 3/1976 | Simpson et al. | 55/DIG. 33 |
| 3,966,440 | 6/1976 | Roberts | 96/117.5 |
| 4,154,586 | 5/1979 | Jones et al. | 55/DIG. 33 |
| 4,313,743 | 2/1982 | Wallace | 55/DIG. 33 |
| 4,548,626 | 10/1985 | Ackley et al. | 96/139 |
| 4,714,486 | 12/1987 | Silverthon | 96/134 |
| 5,022,901 | 6/1991 | Meunier | 96/134 |
| 5,062,874 | 11/1991 | Legare et al. | 96/134 |

*Primary Examiner*—Duane S. Smith
*Attorney, Agent, or Firm*—Arent Fox Kintner Plotkin & Kahn

[57] ABSTRACT

A method for manufacturing a gas mask canister using a HEPA filter media having plastic separating plates inserted into between HEPA filter media at certain intervals. The HEPA filter, impregnated activated carbon, and a pre-filter are accommodated within a cylinder. The cylinder is inserted into a canister having an upper portion and a lower portion detachably coupled together. The impregnated activated carbon, the plastic separating plates and the casing of the canister can be reused, and the rest of elements are burned. A vinyl coating sheet is peeled off from the canister after each use. An indexing tab for recording the number of times of peeling is attached on each of vinyl coated sheets, so that the number of uses can be known.

1 Claim, 4 Drawing Sheets

REUSABLE CANISTER FOR A GAS MASK

BACKGROUND OF THE INVENTION

The present invention relates to a method for manufacturing a gas mask canister which is worn by workers handling toxic gases in general industry, or which is used for protecting humans from toxic gases and particulates. More specifically, the present invention relates to a method for manufacturing a canister of gas mask, in which the manufacture is easy. Simple separating plates are installed within the canister so as to inhibit an overload in a high efficiency particulate air (HEPA) filter and to prevent leakage. The casing of the canister and the impregnated activated carbon particles filled therein can be reused. The radioactive materials contaminating on the outer surface of the canister can be easily removed.

In order to protect the workers in general industry using toxic gases, or to protect human lives from military toxic gases, gas masks are used in which impregnated activated carbon and a HEPA filter are provided. Actually, gas masks have been manufactured in various forms since the First World War as a means to protect against chemical military weapons. The gas masks were filled with impregnated activated carbon for removing toxic gases. The impregnated activated carbon consisted of activated carbon particles impregnated with oxides of: 5–9% of copper, 2–4% of chrome, 1–2% of zinc and 0.1–0.4% of silver. However, recently, those oxides, (particularly chrome) which are harmful to the human body are excluded. The remaining metal oxides are impregnated into the activated carbon, and impregnation with an amount of 4% TEDA (tri-ethyldiamine) follows. Various other impregnated materials are used in the gas masks. Domestically, gas masks which had been developed by the United States were introduced and used. At present, gas masks which make it possible to drink water and talk while wearing them have been developed and are supplied to soldiers. Besides the military use, masks have been developed for aeronautic use, civil defense use, industrial use, and radiological use (in the nuclear power plants).

Each gas mask includes a face portion, a canister, and a carrying sack. The canister is filled with impregnated activated carbon particles for removing toxic gases and a filter media for removing particulates. The canister removes the fine particulates and toxic gases to protect the wearer.

In the gas masks which are used in nuclear power plants, the mask can be reused by repeatedly cleaning the outer surface of the case which has been contaminated with radioactive materials until the gas mask shows a lowered performance. When the canister shows a lowered performance, the canister is classified as a radioactive waste requiring proper disposal. This radioactive waste requires a high disposal cost, and an economic loss is brought about. Therefore, if the impregnated activated carbon particles and the casing of the canister are reused, then the volume of the radioactive waste can be reduced to a great degree.

Generally, the canister of the gas mask includes a pre-filter, a HEPA filter, and an impregnated activated carbon particle layer.

The pre-filter removes coarse particulates to protect the activated carbon and the HEPA filter so as to extend the lifetime of the gas mask.

Besides the use of the impregnated activated carbon in the gas masks, the impregnated activated carbon is widely used in adsorption apparatuses for removing toxic gases in the chemical industries, for adsorbing organic iodides in nuclear power plants, and for purifying air from general industry facilities. Particularly, among the gaseous radioactive materials generated from nuclear power plants, the radioactive organic iodides are absorbed and removed by the KI (potassium iodide), TEDA (tri-ethylene diamine) impregnated activated carbon.

The HEPA filter shows a removing efficiency of 99.9% for the particulates of 0.001 $\mu$m to several $\mu$m. Even for the DOP aerosol of 0.3 $\mu$m which is the maximum penetrating size, the minimum efficiency should be 99.97%. The HEPA filter is installed within the canister, to remove not only fine particles but also radioactive particulates in air generated from nuclear power plants. The HEPA filter in the gas masks has corrugated HEPA filtering media instead of aluminum separators for ensuring air ventilation between filtering media.

Thus in the canister of the gas masks for the nuclear power plants, based on the three filter system, there is installed the pre-filter, the HEPA filter, and a filling of the impregnated activated carbon.

However, in the conventional gas mask manufacturing method, there are encountered the following problems. That is, when installing the filtering material into the canister, the sealing is usually imperfect, with the result that leakages occur frequently, and that the filtering material is frequently damaged. Further during the filling of the impregnated activated carbon particles, the filling becomes non-uniform, with the result that the adsorption efficiency for the radioactive gas is lowered. Further, due to the difference in the pressure losses, the respirations become irregular.

Therefore, in the above described manufacturing method, the manufacturing efficiency is low, the product defects are high, and the whole filter has to be discarded when a defect occurs. Further, the canister of the conventional gas mask is impossible to reuse, thereby adding to the volume of radioactive waste. Further, after each use, the contaminated radioactive materials on the outside of the canister have to be removed by decontamination methods.

SUMMARY OF THE INVENTION

The present invention is intended to overcome the above described disadvantages of the conventional technique.

Therefore it is object of the present invention to provide a method for manufacturing a gas mask, in which the reuse of the casing of the canister and the impregnated activated carbon are possible, and the contaminated radioactive materials of the outside of the canister can be easily removed.

In achieving the above object, the method according to the present invention includes the steps of: manufacturing a canister of the gas mask, manufacturing a HEPA filter, and providing an activated carbon filter.

Instead of using a corrugated HEPA filter media with threads for ensuring the air ventilation, HEPA filter media are cut with a certain shape and corrugated, and plastic separating plates are inserted into the spaces between corrugated HEPA filter media at certain intervals. Thus the damage of the HEPA filter, which is liable to occur in the case with cutting a corrugated HEPA filter media, can be prevented. Further, the leakages are prevented, and the manufacture of the HEPA filter is rendered easier. Impregnated activated carbon particles, HEPA filter media and a pre-filter are accommodated within a cylinder, and the cylinder is inserted into the canister, so that the installation is convenient. The leakage of the canister can be prevented, thereby improving the safety during use. Further, in order to facilitate the reuse of the canister, an upper portion and a lower portion of the canister are detachably coupled together.

Conventionally after each use, the contaminated radioactive materials on the surface of the canister outside are removed by using conventional decontamination methods for the gas mask. Instead of this, in the gas mask of the present invention, a vinyl coated sheet is peeled off from the canister surface after each use, so that the removal of contaminated radioactive materials is easy. Further, indexing tabs for recording the number of times of peeling are attached, so that the number of uses can be known, thereby knowing the deterioration of the performance of the gas mask in an indirect manner.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
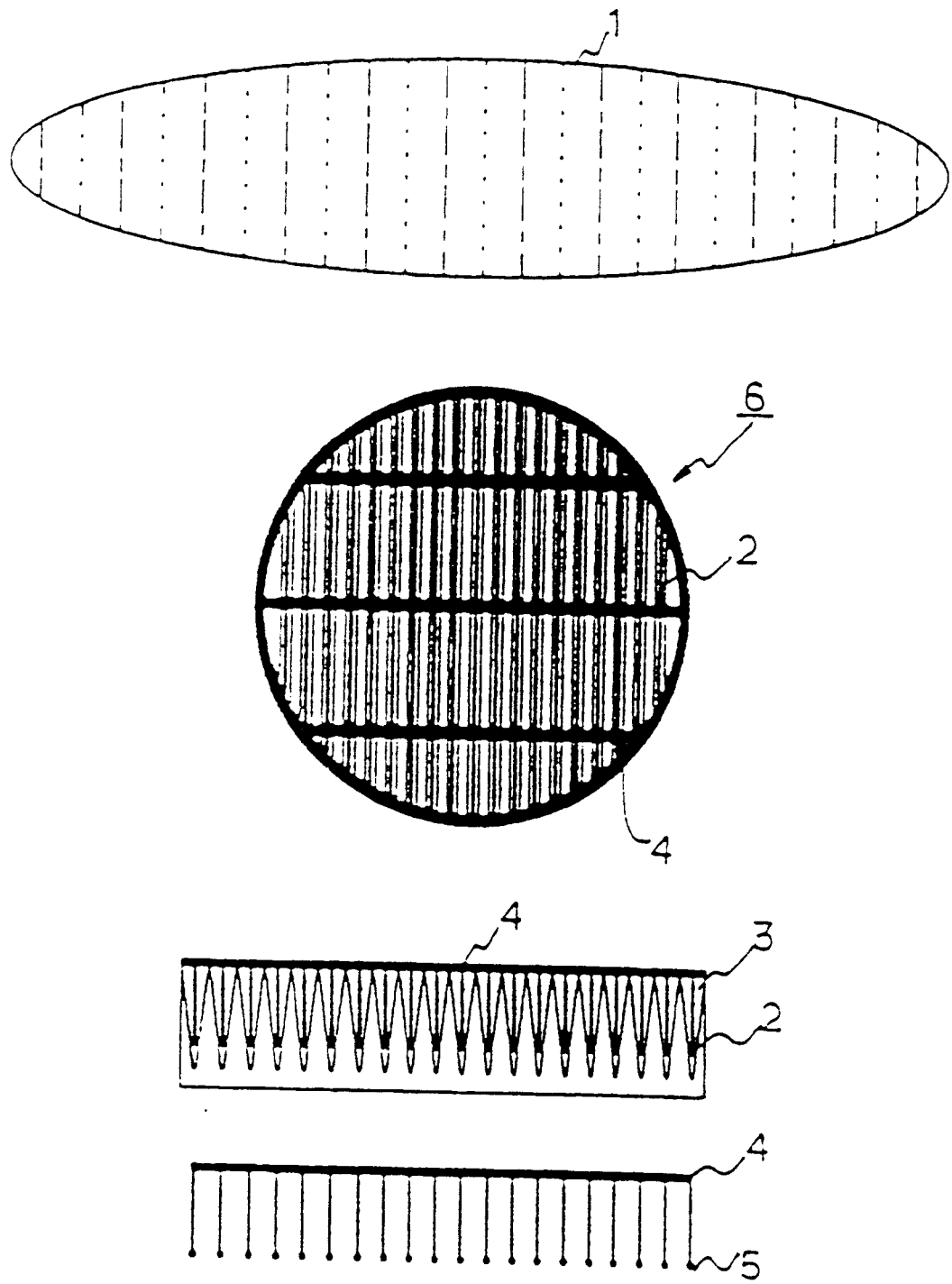
FIG. 1 is a sectional view of the cut and corrugated HEPA filter with a certain shape according to the present invention.

The constitution of the gas mask according to the present invention will be described referring to the attached drawings.

The method for manufacturing a canister of an gas mask according to the present invention includes the steps of: manufacturing a corrugated HEPA filter 2 by using plastic separating plates 4 to secure air ventilating paths in the HEPA filtering media; inserting and assembling a pre-filter 7, a HEPA filter 1 and impregnated activated carbon particles 8 into a paper or plastic tubular cylinder 6, and assembling an upper portion 16 and a lower portion 17 of the canister 15 together by making protuberances 18 and slots 19 match together; and attaching vinyl coated sheets 20 on a circumference of the canister, so as to make it easy to install, assemble, detach and decontaminate.

The method further includes the step of attaching a pair of gaskets 12 on a top and a bottom of the cylinder 6 respectively, each of the gaskets 12 having a groove 14 and an air cushion 13.

The method according to the present invention is characterized in that: a plurality of vinyl coated sheets 20 are attached on the outer circumference of the canister 15 to secure the upper portion and the lower portion together; an outermost sheet of the vinyl coated sheets 20 is removed to decontaminate the exterior of the canister of the radioactive contamination materials; an indexing tab 21 is attached to each of the vinyl coated sheets 20 to make it possible to peel off one sheet by one sheet; and numbers are entered on the indexing tabs 21 in a sequential form to make it possible to recognize as to how many sheets have been peeled off.

The method for reusing the canister according to the present invention includes the steps of: peeling off an outermost vinyl coated sheet 20 after each use; detaching an upper portion from a lower portion; taking out a cylinder 6 from the case; and removing the impregnated activated carbon filter, plastic separating plates 4 of a HEPA filter 1 and a cylinder 6, thus reusing all parts except the HEPA filter 1 and the pre-filter 7.

Now the manufacturing method for the gas mask according to the present invention will be described in further detail.

As shown in FIG. 1, by taking into account the required area of the HEPA filter media in view of the fine particulates, the HEPA filter media 1 is sheared into an elliptical piece. Then this elliptical HEPA filter media is bent into a corrugated form by using a corrugating machine, to form a corrugated filter 2. Then in order to ensure air ventilation through the corrugated HEPA filter 2, proper gaps 5 are provided between the corrugated walls of the HEPA filter 2. Then plastic separating plates 4 are prepared, and are inserted into the gaps. During the insertion, care is exercised so that the filtering material would not be damaged.

Figure 2:
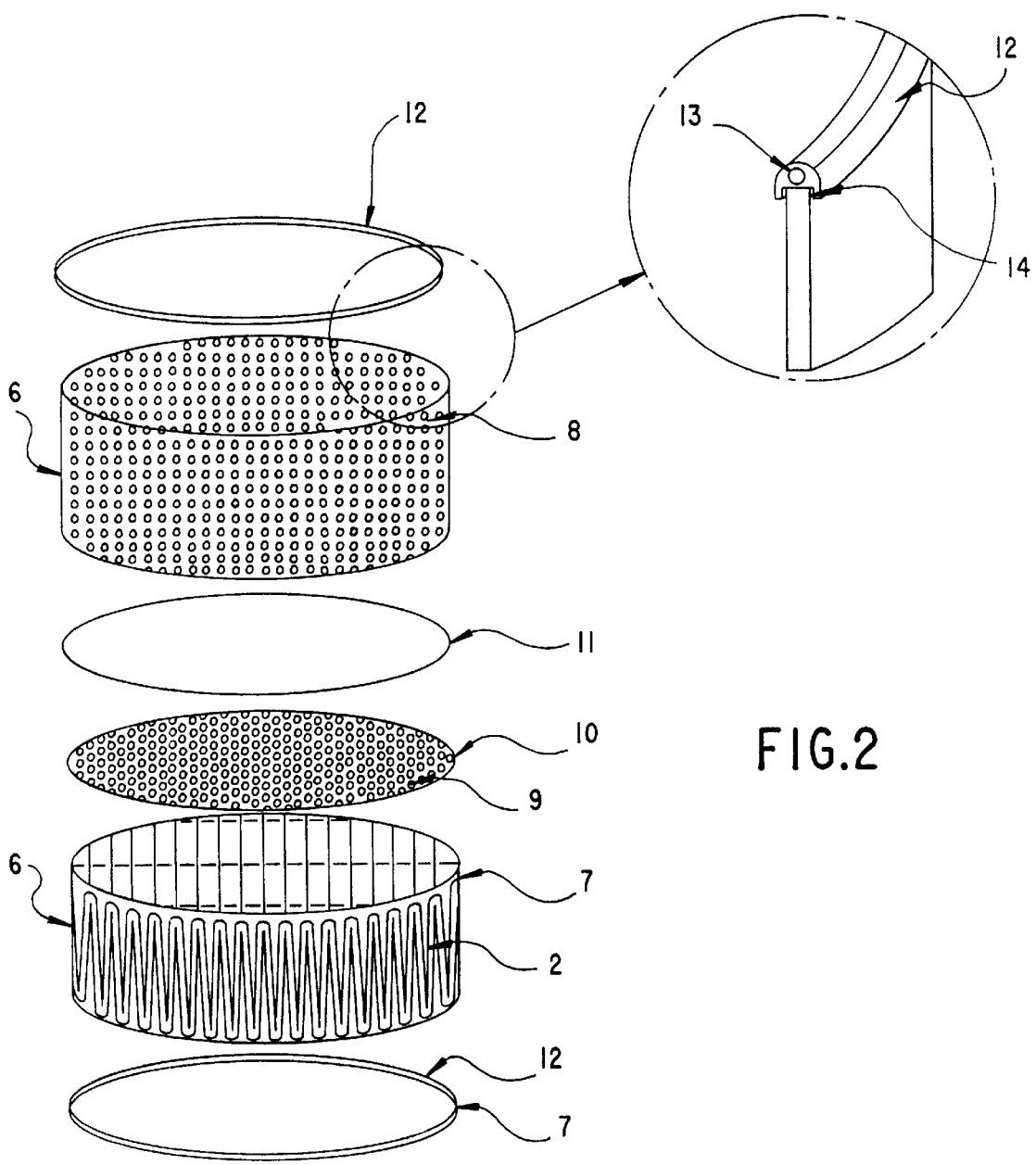
FIG. 2 is an exploded perspective view of the gas mask canister with pre-filter, the HEPA filter and the impregnated activated carbon particles according to the present invention.

Referring to FIG. 2, a paper or plastic tubular cylinder 6 is manufactured, and then, the corrugated HEPA filter 2 is installed within the cylinder 6 by using an adhesive. A pre-filter 7 is installed upon the top of the corrugated HEPA filter 2. Thereafter, the cylinder 6 is laid upside down, and then, a perforated separating plate 10 is installed. The plate 10 has a plurality of small holes 9, so that the corrugated HEPA filter 2 does not directly contact with the impregnated activated carbon. Then, a non-woven fiber 11 is attached so that the fine impregnated activated carbon particles 8 would not pass through the holes 9 of the separating plate 10. After the impregnated activated carbon particles 8 are sufficiently filled into the cylinder 6, another non-woven fiber 11 is attached so that the impregnated activated carbon particles would not leak to the outside of the cylinder 6.

A gasket 12 is provided for preventing the leakage of air through each of the ends of the cylinder 6. In order to inhibit the leakage of air, an air cushion 13 is formed along the inner edge of the gasket 12. A groove 14 is formed on the bottom of the gasket 12, the cylinder 6 being inserted into the groove 14. In this manner, the leaking of air is prevented during the procedure of joining the cylinder 6 to the canister. Thus the corrugated HEPA filter 2 and the impregnated activated carbon particles 8 are assembled into the cylinder 6.

Figure 3:
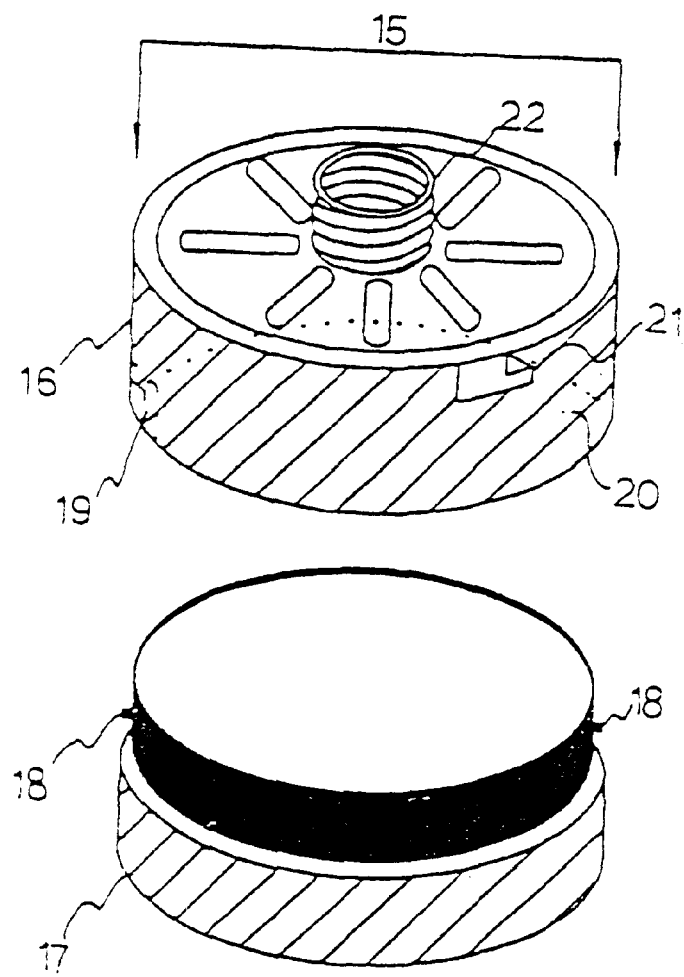
FIG. 3 is a sectional view showing the upper and lower portions of the canister of the gas mask according to the present invention.

The cylinder 6 is assembled into the canister 15 in the following manner. The upper case portion 16 and the lower case portion 17 which constitute the canister 15 are illustrated in FIG. 3. A pair of protuberances 18 and a pair of slots 19 are provided respectively on the lower case portion 17 and the upper case portion 16, so that the upper and lower case portions 16 and 17 can be coupled and secured together.

The cylinder 6 is installed into the canister 15 which has been manufactured in the above described manner, in the following manner. That is, the cylinder 6 is inserted into the lower portion 17 of the canister 15, and then, the upper portion 16 is fitted to it. Then they are compressed from the opposite ends inward, so that the protuberances 18 and the slots 19 are matched together. Then a plurality of vinyl coated sheets 20 are attached round the surface circumference of the canister 15, so that the upper portion 16 would not be detached from the lower portion 17, and that the decontamination would become easy. Further, in order to facilitate the detachment of the vinyl coated sheets 20, an index tab 21 is attached on each of the vinyl coated sheets 20. The canister thus assembled is joined to the gas mask through a canister connecting portion 22.

After the use of the gas mask, the decontamination of the radioactive material is carried out by peeling one vinyl coated sheet by holding the indexing tab 21. Thus the decontamination can be carried out in an easy manner. After many uses, if the canister 15 shows a lowered performance, then it is classified into a radioactive waste requiring disposal. In this case, any remaining vinyl coated sheets 20 are all detached, and then, the upper portion 16 of the canister 15 of pulled off from the lower portion 17. Then the cylinder 6 is taken out from the canister 15, and then, the impregnated activated carbon and the HEPA filter are taken out from the cylinder 6. Then the plastic separating plates are detached. Then the upper and lower portions 16 and 17 of the canister 15 are recovered to turn them to reuse. Then finally the waste HEPA filter 2 and the cylinder 6 which is the paper or plastic tube are classified into wastes to be incinerated.

Figure 4:
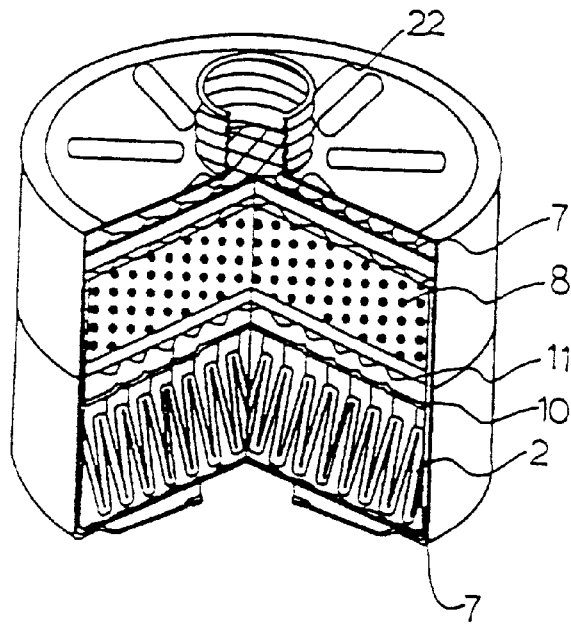
FIG. 4 is a sectional view of the canister of a large gas mask according to the present invention.
Figure 5:
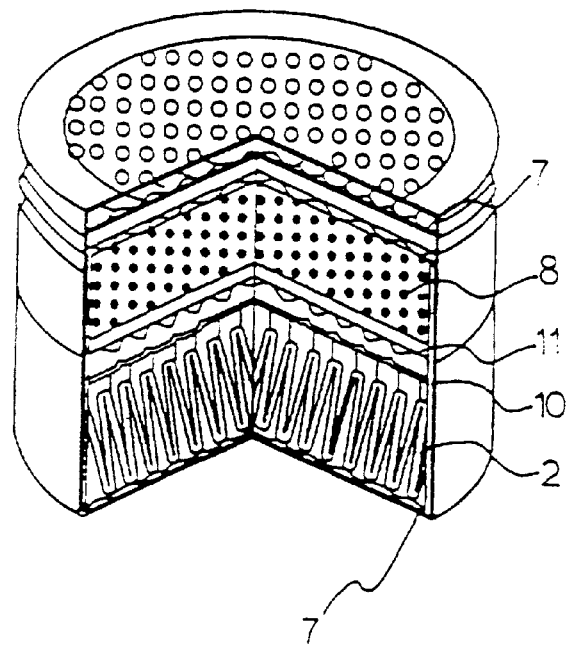
FIG. 5 is a sectional view of the canister of a small gas mask according to the present invention.

FIGS. 4 and 5 illustrate small and large canisters.

In the present invention, the canister can be manufactured in a simple manner compared with the conventional ones. Further, the impregnated activated carbon, the plastic separating plates and the casing of the canister can be reused. Therefore, the volume of the radioactive wastes can be reduced, and during the use, the interim decontamination procedure is eliminated, because it is done by simply peeling off one vinyl coated sheet.

According to the present invention as described above, the canister can be manufactured in a simple manner compared with the conventional ones. Further, leaking defects are reduced by improvement of the productivity. Further, the case of the canister and the impregnated active carbon particles can be turned to reusable items by simple separation manipulations by the user. Further, after each use, the user can decontaminate the mask simply by peeling off one vinyl coated sheet, thereby solving the conventional troublesome task of carrying out the decontamination after each use. Further, the manufacturing cost of the mask is low, and the mask is safe, thereby contributing to improving the economy of the operation of a nuclear power plant.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A canister for a gas mask, comprising an upper body portion, a lower body portion shaped to mate with said upper body portion, a filter contained in said canister, a plurality of vinyl coated sheets attached on a circumference of said canister to secure said upper portion and said lower portion together, an outermost sheet of said vinyl coated sheets being removed to decontaminate radioactive materials from an exterior of said canister, an indexing tab attached to each of said vinyl coated sheets to enable a user to peel off one sheet by one sheet; and numbers entered on said indexing tabs in a sequential form to enable a user to recognize how many sheets have been peeled off.

* * * * *